United States Patent Office 3,315,475
Patented Apr. 25, 1967

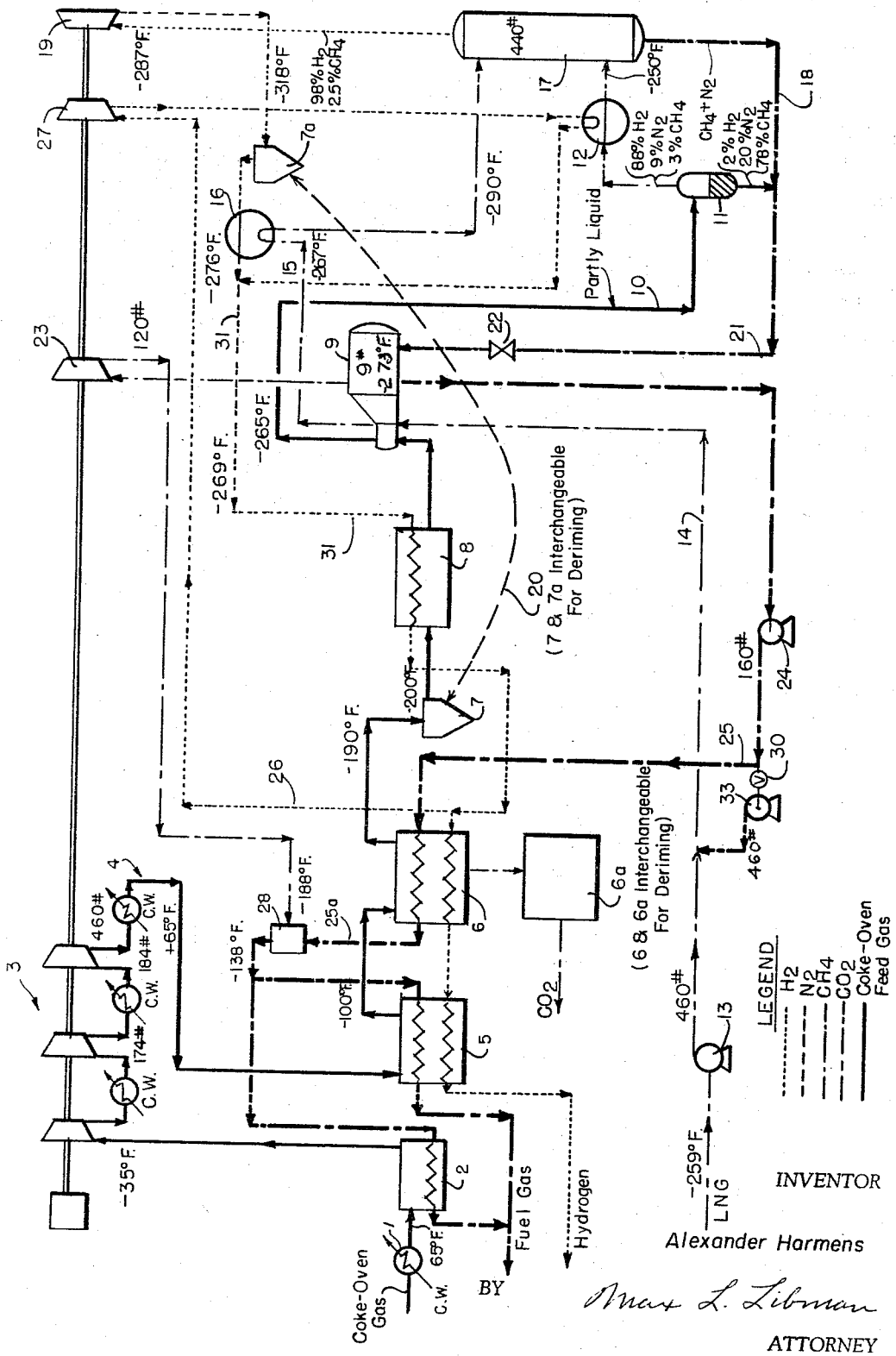

3,315,475
FREEZING OUT CONTAMINANT METHANE IN THE RECOVERY OF HYDROGEN FROM INDUSTRIAL GASES
Alexander Harmens, Purley, Surrey, England, assignor to Conch International Methane Limited, Nassau, Bahamas, a Bahamian company
Filed June 15, 1964, Ser. No. 375,131
Claims priority, application Great Britain, Sept. 26, 1963, 37,870/63
9 Claims. (Cl. 62—12)

This invention relates to the recovery of hydrogen from industrial gases containing appreciable amounts of hydrogen and methane, as for instance, coke-oven gas, coalgas, oil gas, derived for instance from a gas oil, oil refinery cracking gas, carburetted water gas, and so on. The recovery of hydrogen from coke-oven gas is a particular attractive possibility on an economic basis, and provided methane is not lost; and the invention will be more particularly described hereinafter by reference to a coke-oven feed gas.

The present invention which aims at this recovery stems from the availability in bulk of liquefied natural gas, which term is herein intended to include also liquefied methane and is throughout hereinafter referred to as L.N.G.

This product is becoming available in bulk, being transshipped by ocean tanker from gas producing areas, as for instance in the Sahara. The utilization of the considerable energy which is represented in the low temperature of large quantities of the liquefied fuel gas constitutes a major objective in the present invention.

A further objective is the utilization of L.N.G. to recover substantially pure hydrogen and to replace it by a valuable fuel gas in quantities broadly comparable with the hydrogen recovered.

According to the present invention, in a process for the recovery of hydrogen from an industrial gas also containing methane, the latter is partially liquefied, the remaining gaseous fraction washed in sub-cooled L.N.G. in an absorber, from which hydrogen contaminated only by minor amounts of methane is recovered, and the liquefied fraction combined with the liquid absorber bottom product is caused to serve as refrigerant for partially liquefying incoming feed gas. Hydrogen leaving the absorber is caused to lose further heat by expansion, for instance, in a suitable expansion machine, and thereby any contaminating methane carried over is caused to solidify out which can be recovered for instance in a cyclone. The purified hydrogen thus cooled may serve through heat exchange to sub-cool the stream of L.N.G., or part of said stream passing to the absorber.

The refrigerant comprised by the mixture of the aforesaid liquefied fraction and liquid absorber bottom product may be passed to an evaporator where it is caused to boil by a steady withdrawal of vapor to a compressor, and by partial cycling off to the chilling section. In this evaporator a tube bundle carrying the feed gas, and if desired a further tube bundle carrying the L.N.G may be disposed. The feed gas before entering the evaporator may advantageously be partially purified through heat exchange with returning hydrogen and/or fuel gas, whereby heavier constituents such as water and/or carbon dioxide are recovered as solid products. In the evaporator partial liquefaction of the incoming feed gas occurs and separation of the feed into two phases may take place in a phase separator from which the gaseous fraction passes on to the bottom of an absorber.

Since absorption requires a wider temperature differential between sub-cooled L.N.G. and incoming feed, the gaseous product may be allowed to gain some heat through heat exchange with a side-stream of hydrogen, which in turn has received heat, for instance through cooling the incoming L.N.G on its way to the evaporator.

The absorber takes out remaining constituents in the gaseous fraction other than hydrogen, which passes overhead usually contaminated with a small amount of methane. The liquid absorber bottom product is mixed with the liquefied fraction of the feed and the combined product passed to the aforesaid evaporator. Herein a part of this combined product is evaporated whereby heat is abstracted from the incoming feed gas and from incoming L.N.G., and a lower equilibrium temperature in the evaporator is established. The remaining cold liquid, suitably pressurized, may be cycled back to cool and purify the incoming feed gas on its way to the evaporator. Fuel vapor and liquefied fuel cycled off from the evaporator after cooling incoming feed gas may thereafter be combined in one stream and any surplus cold left in this combined stream may be used as a pre-cooling medium for the feed gas.

The recovered hydrogen may likewise assist and supplement the liquid or gaseous fuel as a coolant in purifying heat exchangers and in pre-cooling heat exchangers. Moreover, any methane recovered as solid product from the hydrogen from the absorber may be mixed with fresh feed and thus also contribute to the cooling of the latter, as will hereinafter be described.

The specific nature of the invention, as well as other objects and advantages thereof, will clearly appear from a description of a preferred embodiment, as shown in the accompanying drawing, in which:

The figure is a schematic flow sheet for a plant for the recovery of hydrogen from a coke-oven gas.

A stream of coke-oven gas having the approximate composition

| | Mol percent |
|---|---|
| $H_2$ | 55 |
| $N_2$ | 12 |
| $CH_4$ | 28 |
| $CO_2$ | 5 |
| | 100 | was cooled by a water cooler 1 to 65° F. and by a further pre-cooler 2, wherein it was refrigerated by surplus high level cold in returning fuel gas to −35° F. The gas stream passed on to a 3-stage compressor 3, wherein it was compressed successively to 74, 184 and 460 p.s.i. with inter-cooling against water in a bath 4. The compressed gas finally emerged at a temperature of 65° F. and then passed to the chilling section.

In the first heat exchanger 5 of the chilling section the gas stream was cooled to −100° F. against returning streams of purified hydrogen and of fuel gas. This chilling was followed by further chilling in one of a pair of purifying heat exchangers 6 and 6a. Here cooling against returning streams of purified hydrogen and of fuel gas reduced the temperature to − 190° F. and carbon dioxide separated out as a solid. When necessary on account of carbon dioxide deposition, switching was effected to the second clean heat exchanger and the solid carbon dioxide deposit was purged with air. Thereafter the gas at a temperature of −190° F. and containing only traces of carbon dioxide passed to the central port of cyclone 7 or cyclone 7a, which cyclones, as suggested by the broken line 20 were coupled in a manner hereinafter set forth. The purified gas emerged at −200° F. One further heat exchange in heat exchanger 8 against the returning stream of purified hydrogen reduced the temperature to −210° F. and the gas then passed into the warm side of an evaporator 9.

In this evaporator the purified gas was chilled to −265° F. and thereby partially liquified while passing through a tube bundle (not shown) in the evaporator. The partially liquified gas stream emerged via line 10 to a phase separator 11, wherein a liquid fraction containing about 2% hydrogen, 20% nitrogen and 78% methane separated out from a gas fraction containing about 88% hydrogen, 9% nitrogen and 3% methane. The gas fraction from this phase separator passed to a heat exchanger 12, wherein it was raised to a temperature of −250° F. against a side stream of purified hydrogen. From this heat exchanger the gas fraction passed into absorber 17 operating at about 440 p.s.i.

L.N.G.—in this particular instance, liquefied methane at −259° F.—was pressurized to 460 p.s.i. in booster 13 and thereafter passed via line 14 into evaporator 9. On transversing a tube bundle (not shown) in the evaporator the L.N.G. was sub-cooled to −267° F. and emerged via line 15. It then passed to heat exchanger 16 wherein it was cooled against an expanded cold stream of purified hydrogen to a temperature of −290° F. At this temperature it entered the top of absorber column 17. In this column the partial purified coke-over gas feed was effectively scrubbed to remove nitrogen. As will be seen the liquid absorber bottom product was in communication by line 18 with the liquified fraction of the feed in phase separator 11.

The gas emerging from the top of absorber 17 was substantially an equilibrium mixture of pure hydrogen containing approximately 2.5% methane. At a temeprature of −287° F. this hydrogen stream is caused to expand through an expansion machine 19, thereby suffering a pressure drop to 160 p.s.i. and a temperature fall to −318° F. At this temperature virtually all methane present was frozen and can be removed on passing to cyclone 7a.

As already indicated, cyclones 7 and 7a were coupled together and could be switched to perform successively two different functions. While cyclone 7a collected frozen methane, cyclone 7 vaporized any solidified methane deposited therein, this being vaporized and taken up by the incoming coke-over gas feed which was thus further cooled. Cyclone 7a in due course was switched into the incoming feed gas line in place of cyclone 7 which thereupon assumed the former role of cyclone 7a, namely, recovery of methane deposited from the sub-cooled hydrogen stream.

The purified hydrogen emerging from the cyclone then served to sub-cool L.N.G. being fed to the absorber in heat exchanger 16. By reason of this heat exchange, the temeprature of the stream rose to −276° F. It then combined with a side stream of re-cycled hydrogen which had given up heat to the gaseous fraction of the feed in heat exchanger 12, and the combined stream assumed a temperature of −269° F. For the purposes of refrigerating both incoming coke-oven gas and L.N.G. in the evaporator, the mixture of the liquefied fraction in phase separator 11 and liquid absorber bottom product—this mixture having roughly the composition 3% hydrogen, 15% nitrogen and 82% methane—was passed via line 21 and throttle valve 22 into evaporator 9 designed to operate at 9 p.s.i. and at a temperature of −273° F. This reduced pressure was maintained by drawing off vapor through compressor 23, which compressed this vapor to 160 p.s.i. without inter-cooling. Thereby the remaining liquid was caused to boil and an equilibrium temperature of −273° F. was reached, Roughly one half of the material entering the evaporator remained in the liquid phase, this liquid being a mixture of methane and nitrogen. With the aid of booster 24 this liquid was pressurzed to 160 p.s.i. and cycled via line 25 to purifying heat exchangers 6 or 6a where it served to purify incoming feed by freezing carbon dioxide from the latter.

The returning purified hydrogen stream in line 31 served as coolant in the final heat exchanger 8 immediately before the evaporator 9 and also as an additional coolant in purifying heat exchangers 6 and 6a. A side stream of this hydrogen passed via line 26 and booster 27 to heat exchanger 12 and then merged with the purified stream coming from heat exchanger 16. Surplus cold still remaining in the purified hydrogen stream after coming from heat exchangers 6 and 6a was used for further cooling of incoming feed in heat exchanger 5.

The liquid fuel passing from the evaporator via line 25 to heat exchangers 6 or 6a emerged in line 25a from the latter only partially evaporated at a temperature of −188° F. and this 2-phase stream was combined in vessel 28 with the compressed gas vapor from compressor 23. Here any liquid phase evaporated and the combined stream assumed a temperature of −138° F. It was in part used as coolant in heat exchanger 5 and in part in heat exchanger 2 and thereafter the divided streams were recombined having lost substantially all surplus cold.

In a modification of the foregoing arrangements the refrigerating liquid in evaporator 9 was pressurized first to 160 p.s.i. then to 460 p.s.i. and thereafter fed into the incoming L.N.G., the rate of supply of the latter being correspondingly reduced. The amount fed back was so adjusted that the remaining liquid used for refrigerating in the chilling section was just sufficient to operate heat exchangers 5 and 6 or 6a and pre-cooling in heat exchanger 2 was omitted.

The foregoing modification can be put into effect in the drawing by opening valve 30 and operating booster 33; in practice, if this modification is employed, heat exchanger 2 can be omitted.

Manifestly in the chilling section the surplus cold from purified hydrogen and refrigerated fuel gas can be used in other ways from those set forth above without departing from the present invention.

The installation in the treatment of $10^8$ standard cubic feet per day coke-oven gas used 750 long tons per day of L.N.G. and yielded $53 \times 10^6$ standard cubic feet per day of hydrogen and $80 \times 10^6$ standard cubic feet fuel gas. The cold in the L.N.G. contributed 43% of the energy required for separation.

It will be apparent that the embodiments shown are only exemplary and that various modifications can be made in construction and arrangement within the scope of my invention as defined in the appended claims.

I claim:
1. Process for the recovery of hydrogen from industrial feed gases such as coke-oven gas, comprising the steps of
   (a) partially liquefying the feed gas,
   (b) separating the partly liquefied feed gas into a gaseous fraction and a liquid fraction,
   (c) sub-cooling a separate supply of liquefied natural gas,
   (d) washing said gaseous fraction in the sub-cooled liquefied natural gas in an absorber and thereby recovering hydrogen as a major volatile constituent, contaminated only by minor amounts of methane,
   (e) combining said liquid fraction with the liquid absorber bottom product from step (d),
   (f) passing the combined liquids from step (e) in heat-exchange relationship with the incoming feed gas in step (a) to partially liquefy same,
   (g) expanding said methane-contaminated hydrogen leaving the absorber to freeze out the contaminating methane as a separate solid product, and
   (h) using the expanded, methane-free hydrogen obtained for further sub-cooling the liquefied natural gas.

2. Process as claimed in claim 1, wherein the aforesaid combined liquids from step (e) used as refrigerant for incoming feed gas serve also to sub-cool liquefied natural gas being fed to the absorber.

3. Process as claimed in claim 1, wherein methane frozen out as a solid product from the hydrogen stream from the absorber is combined with and cools incoming feed.

4. Process as claimed in claim 1, wherein the methane frozen out as a solid product is recovered from the expanded hydrogen stream by means of a cyclone.

5. Process as claimed in claim 1, wherein refrigeration of incoming feed gas is effected in an evaporator wherein the combined liquid fraction and liquid absorber bottom product is partially evaporated.

6. Process as claimed in claim 5, wherein a part of the combined liquid fraction and liquid absorber bottom product is cycled off to cool and thereby purify incoming feed gas by condensing out heavier components as a solid product.

7. Process as claimed in claim 5, wherein part of the combined liquid fraction and liquid absorber bottom product is brought to the same pressure as and cycled to the liquefied natural gas being fed to the evaporator.

8. Process as claimed in claim 1, wherein the methane-free hydrogen recovered from the absorber, after subcooling the liquefied natural gas, is also used to cool incoming feed.

9. Process as claimed in claim 8, wherein a part of the hydrogen and after expansion and heat exchange with liquefied natural gas and incoming feed gas, is cycled back to provide heat interchange with and lose heat to the gaseous fraction of the feed before it enters the absorber.

References Cited by the Examiner

UNITED STATES PATENTS

| | | | |
|---|---|---|---|
| 1,773,012 | 8/1930 | Schuftan. | |
| 1,830,610 | 11/1931 | Linde | 62—23 X |
| 3,062,015 | 11/1962 | Cost | 62—17 |
| 3,197,970 | 8/1965 | Nelson et al. | 62—17 |

NORMAN YUDKOFF, *Primary Examiner.*

V. W. PRETKA, *Assistant Examiner.*